Dec. 20, 1955    H. E. ELLIOTT ET AL    2,727,761
COUPLERS FOR FLUID-CONDUCTING CONDUITS
Filed Oct. 27, 1951    2 Sheets-Sheet 2
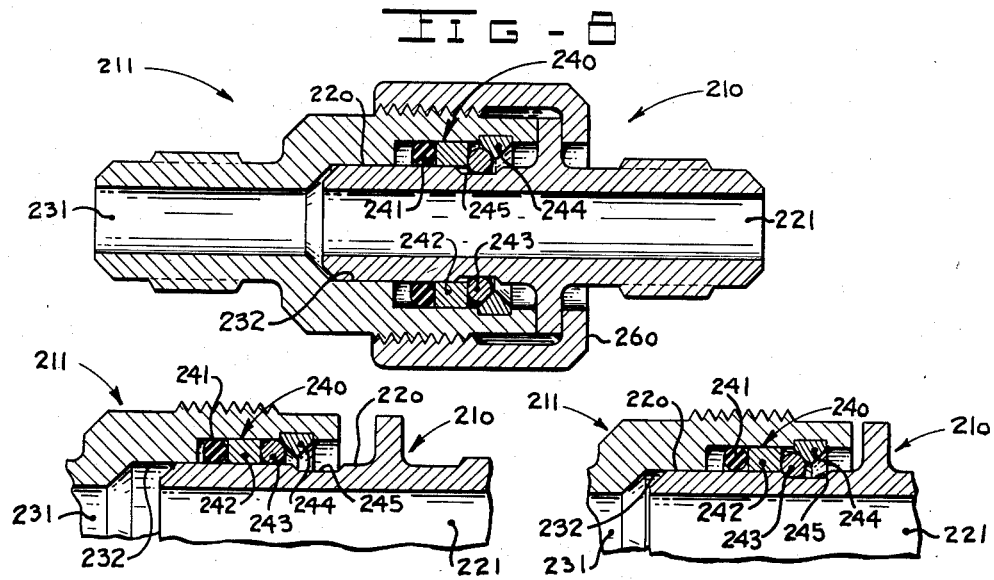
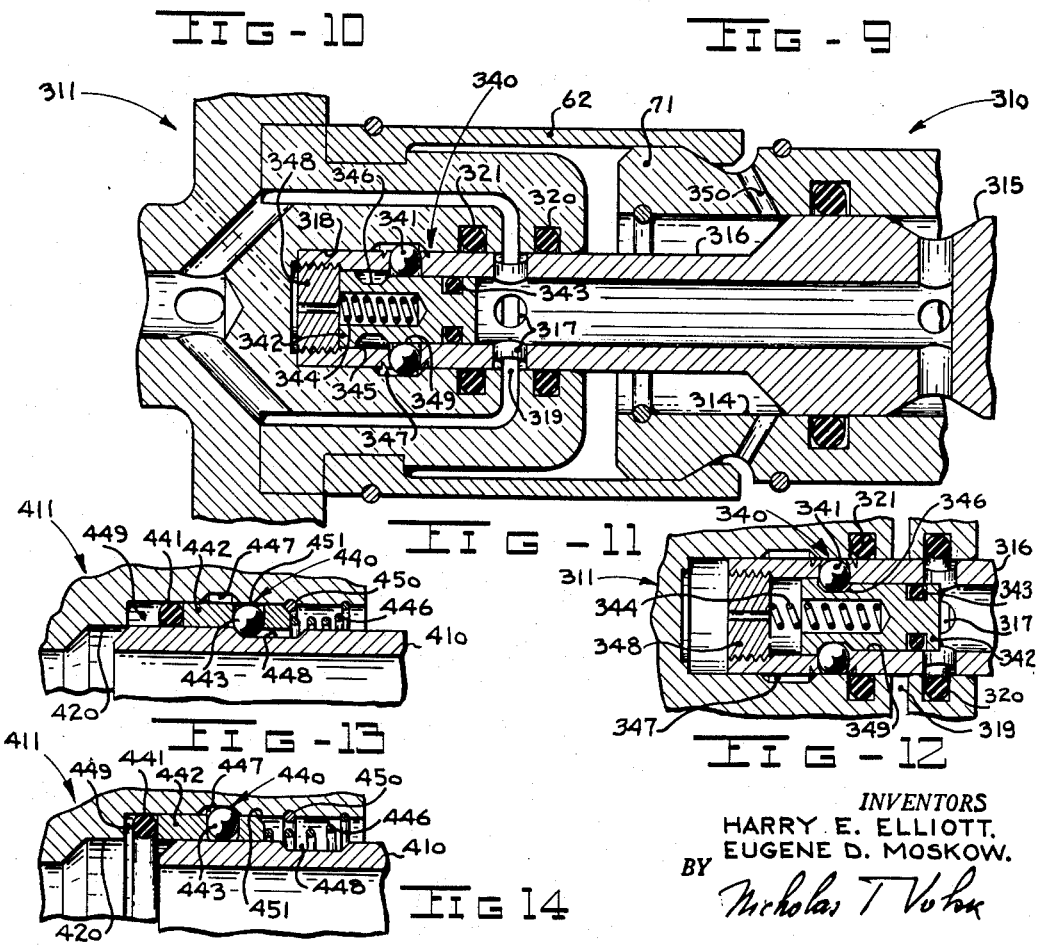
INVENTORS
HARRY E. ELLIOTT.
EUGENE D. MOSKOW.
BY Nicholas T Voken

United States Patent Office 2,727,761
Patented Dec. 20, 1955

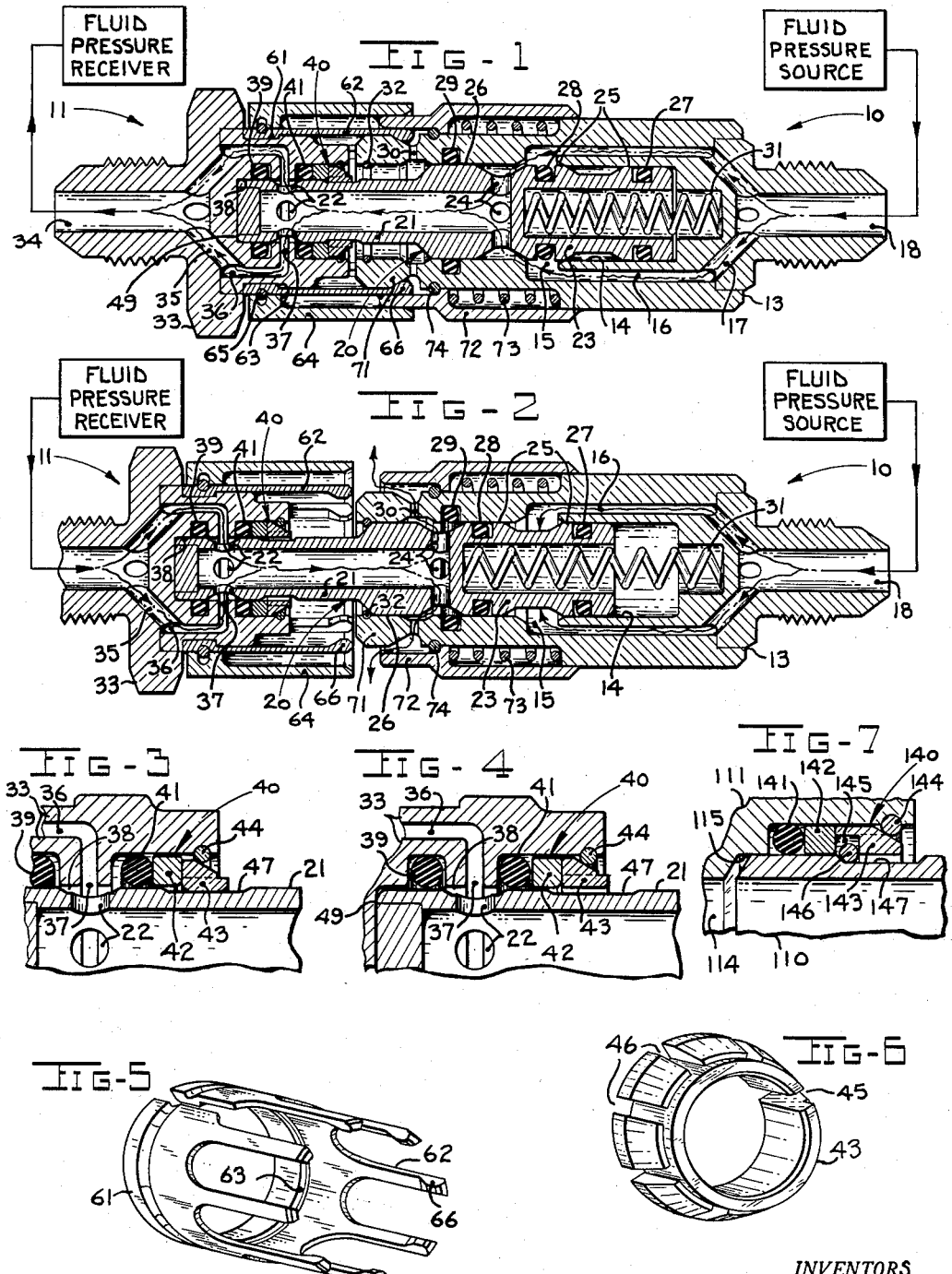

2,727,761

COUPLERS FOR FLUID-CONDUCTING CONDUITS

Harry E. Elliott, Venice, and Eugene D. Moskow, Los Angeles, Calif., assignors to Hughes Tool Company, Houston, Tex., a corporation of Delaware Application October 27, 1951, Serial No. 253,546

1 Claim. (Cl. 285—163)

This invention relates to couplers for fluid-conducting conduits, and more particularly to improvements in couplers of the general type disclosed in copending application entitled "Valved Couplers for Fluid-Conducting Conduits," Serial No. 253,545, filed October 27, 1951, by Harry E. Elliott.

Couplers of the type employed in pneumatic and hydraulic systems generally include means for establishing a fluid-tight connection and means for mechanically maintaining such connection between a pair of separable members which may or may not include a self-closing valve to check the flow of fluid when the members are uncoupled. However, the structures for establishing the fluid conducting connection and the mechanical connection between the separable members generally admit of ready disconnection at any time and under any conditions of internal pressure. When this pressure is extremely high, the sudden release thereof may result in serious injury to personnel or damage to adjacent equipment, and in some types of equipment there are phases of operation during which a sudden cessation of pressure might result in harm to the system. The growing trend toward the use of extremely high pressures is making these dangers increasingly important. In some installations, as for example, military weapons which must be kept in operation during periods of excessive emotional stress upon the operator and maximum stress upon the equipment, a safeguard against embarrassing accidental or inadvertent uncoupling is imperative.

Yet, many of these same installations which require provisions to prevent unintended uncoupling while the fluid system is under pressure must also admit of simple and speedy uncoupling when uncoupling is required. Some of these installations also require the location of a coupler within a confined area which permits the operator to use only one hand for coupling and uncoupling operations.

The disclosed couplers, meeting all of the foregoing requirements, have various forms of a fluid-pressure actuated grip to prevent opening of the fluid connection so long as the coupler is subjected to a fluid pressure greater than a predetermined minimum. Some of the couplers include a valve for closing the fluid passageway through the coupler in combination with a pressure relief means for gradually and safely reducing the downstream pressure to the grip to permit coupler separation. The foregoing structures are embodied in couplers of the quick disconnect type, the threaded type, and may be embodied in couplers having no independent mechanical connecting means.

It is therefore an object of this invention to provide a coupler for fluid-conducting conduits which includes means actuated by fluid pressure to prevent disconnection of the coupler so long as the coupler is subjected to fluid pressure greater than a predetermined minimum.

It is also an object to provide such a coupler in which a mechanical grip, actuated by fluid pressure, operates to prevent inadvertent or accidental separation of the members while the coupler is under pressure.

It is also an object to provide a coupler having a pressure operated mechanical grip which automatically releases at a predetermined minimum pressure so as not to interfere with the ready disconnection of the coupler when disconnection is required.

It is a further object of this invention to provide a coupler including a mechanical-grip fluid-pressure interconnection of the character described which also includes means for relieving any internal fluid pressure safely and gradually when the coupler is being uncoupled.

It is a further object of this invention to provide a means responsive to internal fluid pressure for positively locking the fluid-conducting connection in couplers of the type described in the previously cited copending applications.

It is also an object to provide such a coupler in which the fluid-conducting interconnection also operates to relieve pressure on the downstream side of the coupler during the disconnection operation.

It is an additional object to provide a coupler of the character described in which the fluid-conducting connection, the pressure-relief-port-closing, the pressure-valve-opening, the mechanical connection, and the gripping or locking of the fluid-conducting connection are sequentially performed in the order named.

It is another object to provide such a coupler in which the mechanical disconnection, the pressure-valve-closing, the relief-port-opening, the releasing or unlocking of the fluid-conducting connection, and the breaking of the fluid-conducting connection are sequentially performed in the order named.

It is also an object of this invention to provide a coupler of the character described having a pair of separable members in which the fluid-conducting connection is established by coaxial engagement of complementary cylindrical surfaces formed on the pair of members, and in which the locking of the fluid-conducting connection is accomplished by a detent means which forms a part of the coaxial engagement.

It is a further object of this invention to provide a coupler possessing the above characteristics which can be manufactured by means of ordinary machining operations and without holding excessively close tolerances.

The novel features which are believed to be characteristic of this invention, both as to its organization and method of operation, together with further objects and advantages thereof, will be better understood from the following description considered in connection with the accompanying drawings, in which several embodiments of the invention are illustrated by way of examples. It is to be expressly understood, however, that the drawings are for the purpose of illustration and description only, and are not intended as a definition of the limits of the invention.

With reference to the drawings:

Fig. 1 is a longitudinal sectional view of a coupler with its separable members in coupled relationship showing a mechanical-grip fluid-pressure interconnection;

Fig. 2 is a longitudinal sectional view of the same coupler in half-closed relationship showing the mechanical grip in released position;

Figs. 3 and 4 are enlarged fragmentary sectional views of the mechanical grip shown in Figs. 1 and 2, respectively, in gripped (Fig. 3) and released (Fig. 4) conditions;

Fig. 5 is an oblique view of the finger-latch ring for holding the coupler body members together;

Fig. 6 is an oblique view of the clutch in the mechanical grip;

Fig. 7 is a fragmentary longitudinal sectional view of another embodiment of the pressure responsive mechanical grip;

Fig. 8 is a longitudinal sectional view of a modified form of the invention showing the grip or locking means incorporated into a valveless coupler;

Figs. 9 and 10 are fragmentary sectional views of the mechanical-grip fluid-pressure interconnection illustrated in Fig. 8 in gripped (Fig. 9) and released (Fig. 10) conditions;

Fig. 11 is a longitudinal sectional view of the fluid connection of a coupler showing another modification of the mechanical grip in gripped condition;

Fig. 12 is a sectional view of the mechanical grip in Fig. 11, showing the grip in released position with the fluid connection partially disconnected;

Figs. 13 and 14 are fragmentary sectional views illustrating a further modification of the grip in which the locked position is shown in Fig. 13 and the unlocked in Fig. 14.

Fig. 1 illustrates a coupler comprising separable male and female members indicated generally by reference numerals 10 and 11 respectively, which are shown as they may be installed in a fluid pressure system. Male member 10 includes a body member 13 which is provided with a cylindrical bore 14 extending inwardly from the coupling end thereof and interconnected with the conduit end by a fluid passageway comprising a chamfered annular port 15 in the wall of bore 14, an annular chamber 16, holes 17, and a bore 18 in the threaded nipple formed on the conduit end of body 13.

Slidably mounted for limited axial movement within bore 14 is a piston portion 23 of a generally cylindrical member 20 which member also includes tubular portion 21 extending outside the bore and beyond body member 13 to provide means having an internal passageway for forming a fluid-conducting connection between male and female members 10 and 11. The outer end of the tube 21 is closed and is provided with a plurality of holes drilled radially through the walls of the tube to form coupling ports 22. Extending through the walls of piston portion 23 of member 20 and communicating with the interior of tubular portion 21, is a plurality of radial ports 24 which complete the passageway through cylindrical member 20. Ports 24 communicate with annular port 15 in bore 14 of male body member 13 when male and female members 10 and 11 are connected in fluid-conducting relationship as shown in Fig. 1, thus providing a connection between the passageway in the male body member and the interior of the tubular portion 21.

On the right of radial ports 24, the periphery of piston portion 23 forms a pair of blocking lands 25 having O rings 27 and 28, which lands cooperate with the O rings and bore 14 to block annular port 15, as shown in Fig. 2, and prevent any flow of fluid from the passageway in body member 13 into the interior of tubular portion 21, and to prevent any loss of fluid from bore 14. On the left of radial ports 24, the periphery of piston portion 23 forms a bore-sealing land 26 which cooperates with bore 14 and O ring 29, in the wall of the bore, to prevent fluid loss from bore 14 when the piston portion of member 20 has moved within the bore to a position where radial ports 24 communicate with annular ports 15 as shown in Fig. 1.

Pressure relief ports 30 are provided in the wall of bore 14 for communication with radial ports 24 in the wall of piston portion 23 for exhausting fluid pressure within tubular portion 21, when annular port 15 is blocked as illustrated in Fig. 2. A spring 31, seated in cavities provided in the head of piston portion 23 and the bottom of bore 14, constantly urges member 20 to the position shown in Fig. 2, where further outward movement is prevented by a snap ring 32 in the wall of bore 14, and where lands 25 of the piston portion, in cooperation with O rings 27 and 28, seal bore 14 and block annular port 15.

From the above description, it becomes apparent that piston portion 23 of member 20 operates as a valve to close annular port 15 and connect radial ports 24 with pressure relief ports 30, or to connect annular port 15 with radial ports 24.

The female member 11 includes a body member 33 which is provided with a fluid passageway comprising a bore 34 through a threaded nipple forming the conduit end of the body member, holes 35, an annular chamber 36, and an annular port 37 in the wall of a cylindrical bore 38. Bore 38 extends into body member 33 from the coupling end thereof for coaxial engagement with the tubular portion 21 of cylindrical member 20, whereby coupling ports 22 are aligned with annular port 37 for establishing a fluid-conducting connection between the passageways in the male and female body members. The connection through these aligned ports is sealed on both sides by O rings 39 and 41 in annular recesses in the walls of bore 38. In addition to O ring 41, the outer recess also accommodates a pressure actuated mechanical grip, indicated generally by reference numeral 40, of which O ring 41 forms a part.

Mechanical grip 40, more clearly shown in Figs. 3 and 4, comprises the O ring 41 which seals the fluid-conducting connection on the outer side of ports 22 and 37, and which, being exposed on its inner side to full fluid pressure, transmits the force exerted thereon by the fluid pressure to a pressure ring 42, which in turn transmits the force as an axial thrust on a clutch or detent 43. Detent 43, illustrated in Fig. 6, is split as shown at 45 to permit radial expansion and contraction, and is also shown with notches 46 which may be varied in number and in depth to adjust the stiffness of resistance to such radial deformation. The outer face of detent 43 is sloped as shown, and bears against a retaining ring 44 fixed in the outer recess so that axial thrust from pressure ring 42 is translated into radial compression on the detent, thus contracting the detent for engagement with an annular recess 47 on the periphery of tubular portion 21 of cylindrical member 20. It is to be noted that the internal pressure required to actuate grip 40 is a function of the stiffness of detent 43, the slope of the outer face thereof, and the projected area of the O ring 41. Varying the stiffness of the detent by varying, as previously indicated, the depth of the notches 46 will vary the pressure required to actuate the grip.

The male and female body members are also equipped with means for providing a releasable mechanical connection between the members which, in the coupler illustrated, takes the form of an improved finger-latch connector of the type described in the copending application previously referred to.

Female body member 33 is provided with a radially split expandible ring 61 having finger-latches 62 extending therefrom as illustrated in Fig. 5. The ring is expanded and slipped over the body member until a shoulder 63 on the inner ring snaps behind a complementary shoulder on the female body member. Encircling the ring is a retaining sleeve 64 for locking the complementary shoulders in engagement, thereby securing the ring 61 to the body member. The retaining sleeve is removably secured by a snap ring 65.

The outer ends of fingers 62 terminate in lugs 66 which engage a shoulder 71 on the male member to effect a mechanical connection between the members. Surrounding the fingers, when the coupling is connected, is a latch-locking sleeve 72, slidably mounted on the male body member and provided with a spring 73 which constantly urges it toward locking position, as shown in Fig. 1, where its outward movement is limited by a snap ring 74. When the male and female members are forced together, in the connecting operation, lugs 66 engage the sloping outer face of shoulder 71 and are thereby spread or bent radially so as to override the shoulder. In this spread position, the ends of the fingers engage locking sleeve 72 and force it back against the resistance of spring 73 a sufficient distance to allow lugs 66 to snap behind shoulder 71. Once the lugs reach this position, fingers 62 disengage the sleeve and permit the sleeve to slide over the fingers to locking position. It is to be noted that, in this position, the locking sleeve prevents the initial spread of the fingers required for disengagement, thus positively locking the male and female body members together. Yet, an external pull on the locking sleeve will compress spring 73 while moving the locking sleeve 72 clear of the fingers, thus permitting the fingers to spread and disengage shoulder 71 incident to complete separation of the male and female body members.

The functioning of the various elements of the coupler during the coupling operations, is as follows: The initial manual operation incident to coupling consists of sliding the projecting end of tubular portion 21 of cylindrical member 20 into bore 38 of the female body member, where it becomes sealed by O rings 39 and 41, and bears against bottom 49 of bore 38. With the end of tubular portion 21 against the bottom of the bore coupling ports 22 of the tubular portion communicate with annular port 37 in the wall of bore 38, thereby establishing a fluid-conducting connection between the interior of tubular portion 21 and the passageway through female body member 33. Further axial movement of the male and female body members 13 and 33 toward each other will cause piston portion 23 of member 20 to move in bore 14 of the male body member, against the force of spring 31, to the position shown in Fig. 1. With the piston portion in this position, land 26 is in sealing engagement with O ring 29, and radial ports 24 communicate with annular port 15 of the male body member, thus forming a fluid-conducting connection between the passageway in body member 13 and the interior of tubular portion 21, which connection is sealed by O rings 27 and 29. This completes a passageway through the entire coupling comprising bore 18, holes 17, annular chamber 16, annular port 15, radial ports 24, the interior of tubular portion 21, coupling ports 22, annular port 37, annular chamber 36, holes 35, and bore 34. As unblocking of annular port 15 is completed, fingers 62 engage shoulder 71 to establish the mechanical connection between the male and female body members, whereupon locking sleeve 72 slides over the fingers for positively locking the body members in fluid-conducting relationship.

Assuming a fluid pressure source is connected to male member 10, and a fluid pressure receiver is connected to female member 11; then upon unblocking of annular port 15 fluid will begin to flow through tubular portion 21 and the passageway of the female body member without loss, because the fluid-conducting connection is completed before the piston portion 23 of cylindrical member 20 begins to move in bore 14. After annular port 15 is unblocked, fluid pressure begins to build up in the passageway through female body member 33, and when this downstream pressure becomes sufficient to actuate grip 40, O ring 41 will translate this pressure into a thrust against pressure ring 42, which in turn will force detent 43 against retaining ring 44, and thus contract the detent into circumferential engagement with recess 47 on tubular portion 21 of cylindrical member 20.

It is to be noted that the foregoing operations are performed by a simple straight-line manual pushing together of the male and female coupler members, and that specific results occur sequentially in the following order: First, the fluid-conducting connection is made and sealed; second, the relief ports are blocked off with respect to said fluid-conducting connection; third, the passageway through the coupler is opened; fourth, the mechanical connection is established; and fifth, the pressure-actuated grip secures the fluid-conducting connection.

It is to be further noted that, although grip 40 provides a positive lock to prevent breaking the fluid-conducting connection so long as there is pressure in the passageway through the coupler, the grip acts, not upon the male body member proper, but upon tubular portion 21 of cylindrical member 20. Hence, the action of the grip does not prevent relative movement between male body member 13 and piston portion 23 of member 20; therefore, when the mechanical connection is released, the male body member can be moved with respect to member 20 to cause the blocking of annular port 15, as shown in Fig. 2, even while the passageway through the coupler is under pressure. With annular port 15 blocked by land 25 and O rings 27 and 28, radial ports 24 communicate with pressure relief ports 30, whereby the downstream fluid pressure is gradually and safely allowed to escape. This reduction in downstream pressure and the resulting release of the grip 40 permits complete separation of male and female members 10 and 11.

From the above, it follows that a coupler embodying the combination of features herein disclosed can be joined in fluid conducting relationship by simply pushing the two coupler members 10 and 11 together, which relationship is positively locked against accidental or inadvertent disconnection caused by the effects of vibration, internal fluid pressure, an external pull on the line, and even intentional efforts at disconnection while the passageway through body member 33 is under pressure. Yet, when necessary, the coupler may be disconnected by a single axial pull on locking sleeve 72, which pull automatically performs the operations necessary to allow the escape of fluid pressure and the release of grip 40 without further effort on the part of the operator. In other words, a single axial pull on sleeve 72 accomplishes the steps of releasing the mechanical connection, closing the passageway through the coupler, releasing downstream pressure, releasing the grip, and finally separating the fluid conducting connection between coupler members 10 and 11 in the order named.

Fig. 7 illustrates a portion of the fluid-conducting connection of a modified coupler in which a mechanical grip employs a snap ring for yieldably maintaining a mechanical connection between male and female coupler members with or without fluid pressure in the coupler passageway. In other words the mechanical connection is effectively maintained by an element of the fluid-pressure actuated grip, and a coupler so equipped would be readily connected or disconnected by a simple straight-line axial push or pull on either member of the coupler, yet would be positively locked in coupled relationship at any time there is fluid pressure within the coupler.

With essential elements shown in fluid-conducting relationship, the coupler in Fig. 7 comprises a tubular member 110 which projects from a male body member not shown, and which is circumaxially engaged by a portion of a female body member 111. Body member 111 includes a passageway 114 connecting the conduit end of this body member to a bore 115 which is adapted to receive the end of tubular member 110. The wall of bore 115 is recessed to accommodate a sealing O ring 141 and the mechanical grip indicated generally by reference numeral 140 of which the O ring forms a part.

In grip 140, O ring 141 is exposed on its inner side to full fluid pressure for transmitting the force of the pressure to a pressure ring 142 which, in turn, transmits the force to a clutch or detent 143. The foregoing structure and its operation is similar to that of the corresponding parts of the grip illustrated in Fig. 1. Detent 143 is split to allow for radial expansion or contraction, and is notched on its inner surface to lessen the stiffness of resistance to radial deformation, and is sloped on its outer face, as shown, for bearing against a retaining ring 144 so that an axial thrust by pressure ring 142 will result in radial compression of the detent. The inner face of detent 143 is provided with a recess 145 to accommodate snap ring 146 which is tensioned for radial contraction to normally engage a recess 147 on the periphery of tubular member 110, thereby providing a yieldable mechanical connection between tubular member 110 and body member 111 of the coupler.

During assembly, the sloping end face of tubular member 110 engages the normally contracted ring 146 and causes the ring to expand so as to permit the end of member 110 to enter bore 115, whereupon ring 146 contracts into recess 147 for yieldably securing the tubular member in the bore of body member 111. A pull on member 110 will cause ring 146 to expand and thus release the mechanical connection.

Grip 140 is actuated by fluid pressure which produces an axial thrust in a manner similar to that described in Fig. 1. Pressure within the coupler forces O ring 141 against pressure ring 142 which, in turn, forces detent 143 against snap ring 144 which translates the axial force into a radial compression force for contracting detent 143 into recess 147. As a result of this contraction of detent 143 into recess 147, ring 146 is prevented from expanding; hence, member 110 is positively locked in bore 115. Release of the fluid pressure will permit expansion of detent 143 and withdrawal of member 110 from the bore.

It is to be noted that snap ring 146 bears against detent 143 during the process of withdrawing tubular member 110 from bore 115, and that the detent tends to respond to such axial force and contract into recess 147 of the tubular member; therefore, in order to make the mechanical grip releasable, detent 143 is made stiffer than ring 146. It is to be noted further than when fluid pressure in introduced into the coupler, this pressure tends to move tubular member 110 out of bore 115 against the holding force of ring 146; therefore, in order to prevent separation of the coupler during the initial stages of pressure rise, detent 143 has a maximum stiffness such as to permit full contraction into recess 147 under the influence of fluid pressure in the coupler co-acting with O ring 141 before such fluid pressure has risen to a value sufficient to eject the tubular member from the bore.

Fig. 8 illustrates a third form of mechanical grip fluid-pressure interconnection incorporated into a simple threaded coupler. This coupler comprises a male body member 210 and a female body member 211. The male body member includes an exterior cylindrical surface 220 and a fluid passageway 221 coaxial with the cylindrical surface and extending through the entire member. Female body member 211 includes a passageway 231 interconnecting the conduit end of the body with a bore 232 having an inner portion in circumaxial engagement with the exterior cylindrical surface 220 of body member 210. The outer portion of bore 232 is enlarged to accommodate a mechanical grip, generally indicated by reference numeral 240, comprising O ring 241 which, being exposed to full fluid pressure on one side, operates to seal the fluid-conducting connection and to transmit the force of the fluid pressure to a pressure ring 242 which bears against a clutch or detent 243 constructed in the form of a toroidal ring. As shown, detent 243 bears against the sloping internal face of a retaining ring 244; hence, the force or axial thrust developed by O ring 241, as a result of fluid pressure in the coupler, is translated into radial compression of detent 243 and causes the detent to circumferentially engage a recess 245 formed on the surface 220 of male body member 210. Upon a reduction of pressure in the coupler, the axial thrust against ring 243 decreases and, when this decrease is sufficient, the ring returns to its normal expanded condition resulting in a release of grip 240. The female body member is externally threaded for engagement with a ring nut 260, loosely mounted on body member 210, but adapted to hold body members 210 and 211 in rigid mechanically coupled relationship.

The operation of the mechanical grip of this coupler is identical to that of the coupler first described. When the coupler members are connected, a fluid-conducting connection, sealed by O ring 241, is made between cylindrical surface 220 of body member 210 and bore 232 of body member 211; while the mechanical connection between the body members is effected by the external threads on member 211 and ring nut 260. Upon the admission of fluid pressure to the passageway through the coupler, pressure builds up in bore 232, forcing O ring 241 against pressure ring 242 which, in turn, forces detent 243 against the sloping surface of retaining ring 244, thereby causing detent 243 to contract radially and engage recess 245 in the cylindrical surface 220 of member 210. When the fluid pressure in the coupler passageway is reduced sufficiently, the resiliency of the toroidal detent 243 causes the detent to return to its normal expanded condition. The expansion of detent 243 produces an axial force which, when not opposed by fluid pressure in the coupler, will return pressure ring 242 and O ring 241 to their normal position such that detent 243 is completely free of engagement with recess 245, as shown in Fig. 10, in which condition members 210 and 211 can be disconnected from each other.

This coupler is appropriate for applications where the fluid-conducting connection must be secured against accidental or inadvertent disconnection while under pressure, but where the speed of making the mechanical connection is not important.

Fig. 11 illustrates a structure for a mechanical-grip fluid-pressure interconnection in which the grip mechanism is included in the male member. The coupler within which this mechanism is illustrated is a quick-disconnect valved type similar to the coupler illustrated in Fig. 1, and comprises body members 310 and 311. The male member 310 includes a cylindrical bore 314 extending from the coupling end of the body and is connected to the conduit end of the body by passageways not shown. Slidably mounted within the bore is a cylindrical member 315 having a tubular portion 316 which extends beyond the male body member similar to tubular portion 21 of Fig. 1. At the outer end of tubular portion 316, are coupling ports 317 and a mechanical grip generally indicated by reference numeral 340. Female body member 311 includes a passageway interconnecting the conduit end of the body with a bore 318 which is adapted for receiving tubular portion 316 so that the passageways of the male and female body members can be interconnected. In the wall of bore 318 is an annular port 319 which forms one end of the fluid-conducting passageway through member 311. Bore 318 is also provided with O rings 320 and 321 positioned on each side of the angular port to seal the bore against fluid loss when tubular portion 316 is received by the bore.

The grip 340 comprises a plurality of radial holes in the wall of tubular portion 316, which holes are located between the end of portion 316 and the coupling ports 317, each of said holes being provided with a spherical detent 341 and a restriction on the outside rim for retaining the spherical detent. To actuate detents 341, a movable plug 342 is slidably mounted within the interior or bore of portion 316, which is sealed against leakage by an O ring 343. Plug 342 is constantly urged toward the grip-released position, shown in Fig. 12, by a spring 344, which position is determined by a shoulder 345 (see Fig. 11) bearing against a mating shoulder in the bore of portion 316. With plug 342 in grip-releasing position of Fig. 12, an annular recess 346 formed in the outer surface of the plug permits radially inward displacement of spherical detents 341 which permits the detents to disengage a recess 347 formed in the wall of bore 318. When detents 341 have moved radially inward, as shown in Fig. 12, tubular portion 316 can be removed from bore 318 for separating body members 310 and 311.

When fluid pressure of sufficient magnitude to overcome spring 344 is admitted to the interior or bore of tubular portion 316, plug 342 is forced to a gripping position shown in Fig. 11, where it bears against a retainer 348. In the gripping position, a land 349 on plug 342 displaces the spherical detents 341 radially outward into locking engagement with recess 347, thus positively locking tubular portion 316 in bore 318.

In this coupler, as in the coupler first described, the male body member 310 is provided with pressure relief holes 350 which function in the same manner as holes 30 in Figs. 1 and 2. The mechanical coupling means is structurally the same as that disclosed in Figs. 1 and 2, and includes latches 62 on body member 311 and shoulder 71 on body member 310. Releasing the mechanical connection will permit sufficient movement of cylindrical member 315 in bore 314 to close the passageway through the coupler and place holes 350 in communication with the bore of tubular portion 316 and the passageway through body member 311, thereby to release any fluid pressure on the downstream side of the coupler. This release of pressure permits spring 344 to move plug 342 such that detents 341 are permitted to move radially inward and allow complete separation of the coupler body members.

Figs. 13 and 14 illustrate an alternate structure for a mechanical-grip fluid-pressure interconnection which combines some of the features illustrated in Figs. 7 and 8 with some of the features illustrated in Figs. 11 and 12. The grip structure shown in Figs. 13 and 14 is adaptable for use with couplers in which the fluid-conducting connection is of the straight-through type with or without a valve mechanism in the male body member.

In Fig. 13, a tubular projection 410 of a body member (not shown) is illustrated in locked position in a bore 420 of body member 411. A counterbore 449 enlarges bore 420 to accommodate a grip 440 which comprises an O ring 441 for sealing the fluid-conducting connection and for providing pressure against a pressure sleeve 442. The pressure sleeve is pierced by a plurality of radial holes, each of these holes being provided with a spherical detent 443 and a restriction terminating at the inner end of the hole for retaining the detent. Pressure sleeve 442 is normally held in grip-released position by a spring 446 shown in Fig. 14. When the sleeve is in this position, an annular groove 447 formed in the wall counterbore 449 permits outward radial displacement of the detents to cause their disengagement from an annular recess 448 formed on the cylindrical surface of tubular projection 410 as the latter is withdrawn from bore 420. When fluid pressure is admitted to the coupled passageways, pressure builds up in the bottom of counterbore 449 behind O ring 441, which pressure forces the O ring against the pressure sleeve. This action seals the fluid-conducting connection between tubular projection 410 and bore 420. When the force derived from the fluid pressure is sufficient to overcome spring 446, pressure sleeve 442 is forced to gripping position, as shown in Fig. 13, where a retaining ring 450 prevents further outward movement. With sleeve 442 in gripping position, a circumferential portion 451 of the wall of counterbore 449 radially displaces the detents into engagement with annular recess 448 of tubular projection 410, thus positively locking the tubular projection in bore 420 of body member 411.

What is claimed as new is:

A coupler for coupling and uncoupling fluid-pressure-conducting conduits, in which the uncoupling operation is positively prevented by fluid pressure in the coupler when such pressure exceeds a preselected magnitude, said coupler comprising: first and second separably coupled body members each having a fluid-conducting passageway, said first body member having a bore communicating with the first-body-member passageway, and locking means circumferentially disposed in the wall of said bore; connecting means effecting a fluid-conducting interconnection of the passageways of said body members, said connecting means including a connecting element associated with said second body member, said connecting element having a cylindrical end-portion projecting outwardly from the second body member and axially and removably received by the bore in the first body member, a passageway communicating with the passageway of the second body member, a port in the cylindrical end-portion interconnecting the passageways of the first body member and the connecting element, and locking means circumferentially arranged in said cylindrical end-portion; holding means associated with the first and second body members releasably holding said body members in coupled relationship; and means preventing removal of the cylindrical end-portion of the connecting element from the bore in the first body member when the holding means is released while the interconnected passageways of the body members contain fluid-pressure exceeding a preselected magnitude, said preventing means being characterized by fluid-pressure responsive means coaxially arranged with respect to the cylindrical end-portion of the connecting element in exposed relationship to fluid-pressure in the interconnecting port, said fluid-pressure responsive means being capable of producing a thrust parallel with said cylindrical end-portion in response to fluid-pressure exceeding the preselected magnitude, and by a locking element cooperatively associated with the fluid-pressure responsive means, the locking means in the bore of the first body member, and the locking means in the cylindrical end-portion of the connecting element, said locking element being adapted to move radially in response to the thrust produced by said fluid-pressure responsive means such that both locking means are simultaneously engaged by said locking element when fluid-pressure in the interconnected passageways of the body members exceeds the preselected magnitude.

References Cited in the file of this patent

UNITED STATES PATENTS

| | | |
|---|---|---|
| 1,838,549 | Herb | Dec. 29, 1931 |
| 1,904,061 | Larson | Apr. 18, 1933 |
| 1,966,278 | Barks | July 10, 1934 |
| 2,040,177 | Johnson et al. | May 12, 1936 |
| 2,129,704 | Meyer | Sept. 13, 1938 |
| 2,441,363 | Krueger | May 11, 1948 |
| 2,453,741 | Bopp | Nov. 16, 1948 |
| 2,463,326 | Smisko et al. | Mar. 1, 1949 |
| 2,509,444 | Mitchell | May 30, 1950 |
| 2,553,680 | Scheiwer | May 22, 1951 |
| 2,612,389 | MacGlashan | Sept. 30, 1952 |